United States Patent [19]

Hanson et al.

[11] Patent Number: 5,642,977
[45] Date of Patent: Jul. 1, 1997

[54] SILO UNLOADER

[75] Inventors: Gregg W. Hanson, Willmar; Howard D. Jacobson, Lake Lillian, both of Minn.

[73] Assignee: Hanson Silo Company, Lake Lillian, Minn.

[21] Appl. No.: 608,842

[22] Filed: Feb. 27, 1996

[51] Int. Cl.$^6$ ................................................. B65G 65/46
[52] U.S. Cl. ........................ 414/320; 414/321; 414/314; 414/319; 414/313; 406/59; 406/56; 406/114
[58] Field of Search ........................... 414/287, 288, 414/304, 310, 311, 312, 313, 314, 315, 316, 319, 320, 326, 321, 322; 222/404, 405; 406/53, 56, 57, 114, 59; 198/671, 663, 669

[56] References Cited

U.S. PATENT DOCUMENTS

| | | | |
|---|---|---|---|
| 3,075,657 | 1/1963 | Hazen | 414/319 X |
| 3,221,904 | 12/1965 | Buschbom . | |
| 3,368,703 | 2/1968 | Lusk | 414/320 X |
| 3,450,277 | 6/1969 | Boppart | 414/319 |
| 3,547,283 | 12/1970 | Beebe et al. | 414/321 X |
| 3,612,306 | 10/1971 | Rambo | 414/320 |
| 3,802,583 | 4/1974 | Tinsley et al. . | |
| 3,912,090 | 10/1975 | Pondell | 414/319 |
| 4,015,734 | 4/1977 | Laidig . | |
| 4,103,788 | 8/1978 | Sutton . | |
| 4,227,836 | 10/1980 | Sizelove et al. | 414/313 X |
| 4,376,360 | 3/1983 | Hanson . | |
| 4,436,473 | 3/1984 | Olson . | |
| 4,583,903 | 4/1986 | Hutchison . | |
| 4,772,173 | 9/1988 | Buschbom et al. . | |

FOREIGN PATENT DOCUMENTS 7802758  10/1979  Sweden ................................. 414/313

Primary Examiner—Frank E. Werner
Attorney, Agent, or Firm—Craig J. Lervick

[57] ABSTRACT

The present invention provides a silo unloader which combines the advantages of both a single auger unloader and a double auger unloader and substantially eliminates the disadvantages of both, to create a silo unloader that is very efficient and effective. Only a portion of the unloader's auger arms has dual augers working therewith while the remaining portion has a single auger. The dual auger functionality is positioned at the end of the auger where most freezing and compaction occurs, thus creating a very aggressive auger at this point. Additionally, the blower of the present silo unloader is positioned at an angle above the augers. This allows for the use of an efficient closed bottom blower in a double auger system while also allowing the placement of the two augers substantially next to each other. By placing the two augers in close proximity to one another reduces the overall width of the auger arm, thus creating a more efficient auger arm.

18 Claims, 3 Drawing Sheets

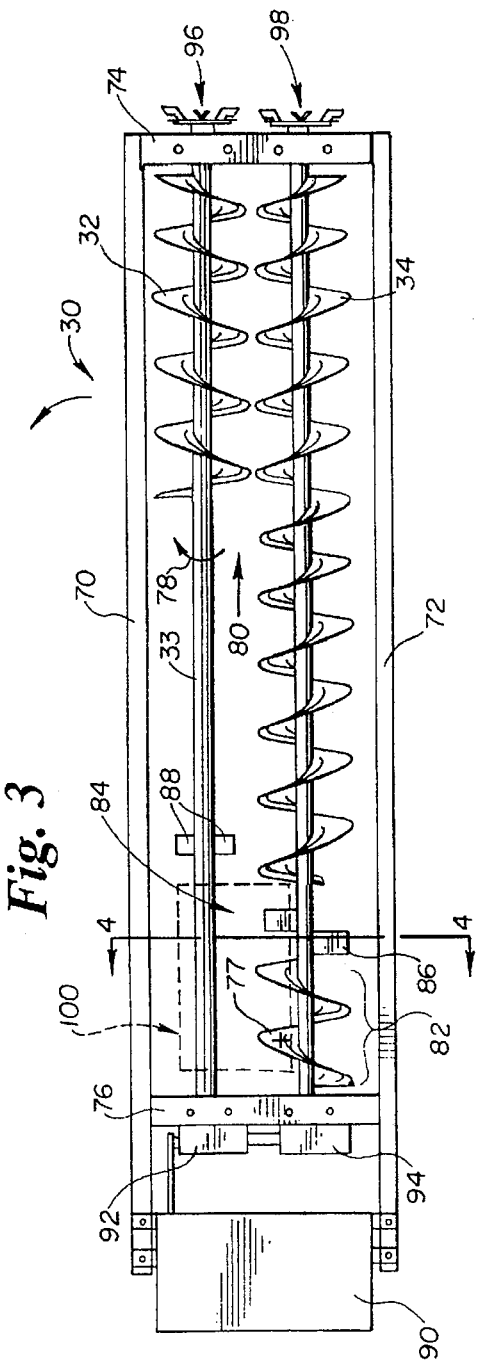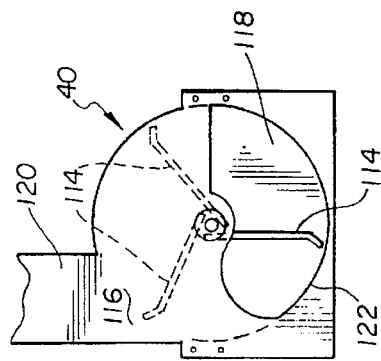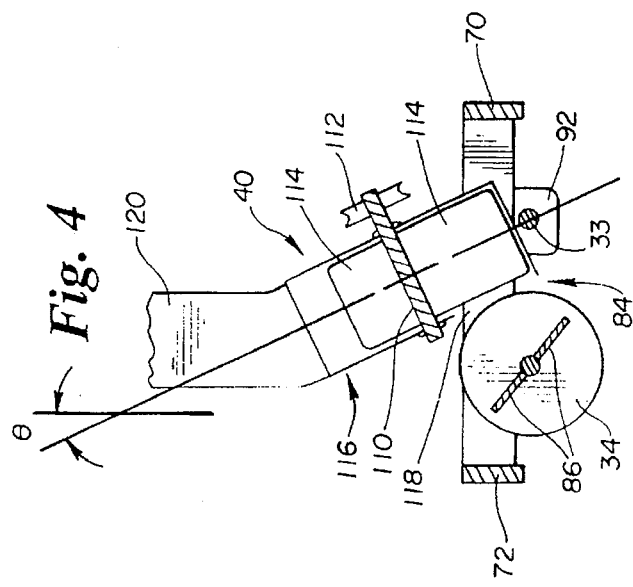

SILO UNLOADER

BACKGROUND OF THE INVENTION

The present invention is a device for unloading silage from a tower silo. More specifically, the present invention relates to a silo unloader used to remove silage from a tower silo and transfer it to a chute extending to the base of the silo.

Top unloading silo unloaders are well known in the art as a method for removing silage from a tower silo (more specifically, a cylindrical tower silo). Generally speaking, the silage is loaded into the silo by simply piling it from the bottom up. When it becomes time to remove silage from the silo (so as to feed livestock etc.), a top unloading silo unloader is lowered onto the silage. The unloader then transfers silage from the interior of the silo to a chute which extends from the top to the bottom of the silo, along an exterior side thereof. The unloader utilizes an auger mechanism which is placed directly upon the silage. The auger operates to pull silage in a uniform manner toward the center of the silo. At the center of the silo unloader is a blower mechanism which receives the silage and propels it through a spout to the aforementioned exterior chute.

There are many commonly known "styles" of top unloading silo unloaders. A single auger device incorporates one auger which is placed on the silage and pulls silage into the center of the silo. A blower is then used to propel silage up and out of the silo.

Several problems exist with single auger silo unloaders. First, when silage is extremely hard (either compacted or frozen), a single auger is not always effective at breaking up the silage and drawing it toward the center of the silo. In extremely frozen conditions, the single auger unloader has a tendency to become ineffective at cutting loose frozen silage and start jumping and bouncing and can actually break components on the unloader.

Top loading silo unloaders generally have mechanisms which allow them to be placed within the round silo tower and then rotate or pivot about the center of the tower. Ideally, the auger arm will evenly cut through all of the silage and uniformly remove it from the silo. More specifically, the silo unloader will not remove silage from one side of the silo at a greater rate than the other side, thus creating an uneven or substantially unlevel upper surface of the silage. A number of things must happen as this auger arm rotates around the silo in order to effectively unload the tower silo. First, as previously mentioned, the auger arm must evenly remove and cut through the silage as it is removed. This becomes extremely difficult, however, when the silage becomes very hard due to either compaction or freezing. Secondly, silage must be evenly removed from the center point so as to avoid the creation of a mound or "plug" at the center or pivot point within the silo below the single auger blower. Also, silage must be removed right up to the walls, thus not leaving additional amounts of silage frozen to or attached to the walls.

Also important in the operation of a silo unloader are all the usual concerns regarding efficient operation (both from a power or energy consumption perspective and a silage transfer rate perspective). A typical farmer would like to move silage at a very high rate and use small amounts of power to do so. Also, as farms continue to get larger, it is very important for the farmer to remove silage at a higher rate (typically the farms of today have more livestock than in previous years).

Another common problem with the aforementioned single auger silo unloaders comes from their use of a closed cavity blower. The blowers generally used in silo unloaders are similar to any other fan or blower mechanism used in numerous material transfer situations. Generally, the blower has a rotating shaft with a number of blades attached thereto. The shaft and blades are configured within an enclosed cavity with an inlet port and outlet port. Silage is then fed into the inlet by some mechanism (usually augers or flipping blades), is engaged by one of the blower blades, and is propelled out the blower outlet port. Attached to the outlet is generally a silage directing spout which will then direct the silage out of the silo. In most single auger silo unloaders, the blower inlet is located on one side of the blower and the outlet is located on a top portion (the side and top defined such that the side is a surface or plane which is perpendicular to the axis of rotation whereas the top is a portion which is parallel to the axis of rotation).

In operation, the single auger silo unloader has its aforementioned auger rotating to draw material toward the center of the tower silo while advancing in the direction opposite the auger rotation. Situated at the center is the blower mechanism which is positioned such that silage is propelled into its inlet. The auger arm or auger assembly then rotates around the tower silo to evenly and uniformly unload material. As this entire mechanism rotates around, the enclosed bottom portion of the blower assembly tends to contact and compact the silage at the center of the silo. Furthermore, due to the alignment of the auger and transfer blades within the silo, this compacted material is not usually engaged by the auger. Therefore, a compacted mound is created which cannot be easily removed by the silo unloader.

In summary, the single auger silo unloader is not desirable because it lacks aggressiveness to break up compacted or frozen silage, and it also tends to create a compacted mound or hill at the center point of the silo under the blower.

A second type of top unloading silo unloader utilizes two augers to draw material toward the center of silo (otherwise known as a double auger silo unloader). This type of design is very desirable in removing compacted or frozen silage as the two augers can work in conjunction with one another to very aggressively break up the silage. Generally, the two augers will be placed parallel one another and will be configured to rotate in opposite directions. This has numerous advantages in removing the silage. By rotating in opposite directions, the rotation of the augers will not tend to pull the auger arm in any specific direction. Stated alternatively, the pulling forces created by the rotation of each auger will tend to cancel out one another. Further, the two augers can be sized differently so as to cut at different depths. This creates more efficiency because each auger is attempting to shave off only a limited amount of material thus allowing the second auger to cut a little bit deeper. As would be expected in the use of two augers, this auger arm is capable of moving much more material or silage at any given time during frozen or hard packed conditions. Conversely, in long cut summer conditions the front auger can be too aggressive and have a tendency to pull the unloader off center.

Usually, as stated above, the augers are placed parallel one another and rotate to pull material toward the center of the silo. Located at the center is a blower assembly for picking up and propelling the silage out of the silo. This blower is configured differently from that of the aforementioned single auger blower however. Due to the configuration of the two augers, it has been found advantageous to put the blower between the two augers. Also, the blowers generally used in this application have an open bottom configuration. In this open bottom configuration, the blower blades are allowed to extend out of the blower housing and directly contact the silage (as opposed to the configuration used in a single auger where the silage material is propelled into a blower inlet). In this configuration the dual augers simply pull silage toward the center of the tower by moving material between the two augers. By placing the open bottom blower between the two augers, these augers naturally propel material to a position where the blower can then interact with the silage and propel it out of the silo.

The open bottom configuration has a second advantage of avoiding the aforementioned compaction created by closed bottom blowers. By having an open bottom, the blower is actually allowed to contact the silage and break it up. This action avoids any compaction or mounding in the center of the silo itself. But one major drawback of this type is that it requires a log more horsepower to run than the enclosed bottom blower.

The use of a double auger silo unloader does not come without its price, however. As mentioned, the open bottom blower is positioned between the two augers. As would be expected, this requires the augers to be spaced a sufficient distance apart from one another so as to allow the positioning of the blower therebetween. This separation requirement increases the width of the auger arm that is used. Remembering that this auger arm rotates around the silo by pivoting at a center point. It is desirable to keep this auger arm as narrow as possible thus allowing efficient rotation and removal of silage from the silo. By utilizing a wider auger arm, misalignments are more easily encountered, resulting in jamming or undesirable forces to be placed on the auger especially in a smaller diameter silo. The width will not allow a single point to extend out to the wall of the silo and remove material therefrom. While each side of the unloader will reach the wall, there will then be a portion or extension between the two augers where a gap exists between the auger arm and the silo wall. This is undesirable as compaction and inefficient removal of silage can occur. Under winter conditions a frozen ridge may form that can make the unloader hang up.

Secondly, the use of an open bottomed blower mechanism, while achieving some advantages, is not very efficient. Energy is lost each time the blower contacts the silage itself and slaps or bangs into any compacted silage. Also, by having an open bottom, the handling of silage by the blower is also not very efficient. As is known by those who deal with fans or material transfer mechanisms, tighter tolerances between the fan or blower blades and the walls of the blower, results in more material being efficiently moved. By utilizing an open bottom blower, material is allowed to fall off either side of the blade and also off the bottom of the blade. Both of these characteristics of an open bottom blower rob both power and efficiency from this type of blower mechanism. Therefore, when the farmer compares the amount of material transferred with the amount of energy used, they may find that they are paying a lot of money in energy costs to transfer silage using this mechanism.

SUMMARY OF THE INVENTION

The present invention provides a silo unloader that utilizes the advantages of both a single auger silo unloader and a double auger silo unloader while minimizing each of their disadvantages. The present silo unloader has a partial dual auger system which will provide the necessary aggressiveness to remove compacted or frozen silage. The auger arm has a first or forward auger which extends a portion of the distance from the outer end of the auger arm toward the center. The auger arm then has a second auger which only extends substantially the entire length of the auger arm. In the preferred embodiment, the first auger extends approximately one-third of the way from the outer end of the auger arm into the center. Due to this configuration, the cutting and aggressiveness of a dual auger system is achieved at the outer edges of the silo. This is a logical use of the dual auger system since in cold weather most of the freezing and compaction occurs at the outer edges of the silo.

A second aspect of the present invention which creates an efficient silo unloader is the positioning of the blower mechanism. Rather than positioning the blower member between the two augers as was commonly done in prior dual auger systems, the blower is positioned at an angle above the first or forward auger. The blower is actually positioned to have a portion of its operating blades existing directly above the drive shaft for the second auger. Positioning the blower in this manner, creates numerous advantages. First, the blower is not positioned between the two augers which allows the augers to be placed in close proximity to one another. The outer edges of the two auger members are very close to one another. This creates a narrow auger arm than is commonly seen in a dual auger system. Secondly, the placing of the blower in a position somewhat nested above the two augers allows for the use of a closed bottom blower mechanism. As previously mentioned, a closed bottom blower is naturally more efficient than an open bottom blower. Also the blower is positioned above the silage; thus, no compaction can take place.

A transfer mechanism is attached to one of the auger shafts which will flip silage into the inlet of the blower which then allows the transfer of material out of the silo. Furthermore, the blower that can be used when positioned in this manner, is substantially wider and shorter than that previously used in a dual auger system. By using a shorter, wider blower, more material can be handled more efficiently. A wider blower paddle can carry more material than a narrow paddle. (Less torque is created on the drive shaft of the blower due to the smaller size of the rotor and paddle assembly.)

It is the object of the present invention to provide a silo unloader which utilizes a partial dual auger system to create the needed aggressiveness to cut through and break up frozen and compacted silage.

Another object of the present invention is to create a silo unloader system which does not have an overly wide auger arm. This "narrower" auger arm allows the auger arm to extend substantially to the wall of the silo.

It is a further object of the present invention to provide a silo unloader system which more efficiently unloads silage at a faster rate than previously possible. Depending on the condition of the silage it is possible to unload two to three times faster than any other conventional single or double auger silo unloader on the market today.

It is yet another object of the present invention to have a silo unloader system which utilizes an efficient closed bottom blower mechanism for the transfer of silage out of the silo.

BRIEF DESCRIPTION OF THE DRAWINGS

The above mentioned objects and advantages can be more clearly seen by referring to the following Detailed Description and the drawings in which:

FIG. 3 is a top view of the auger arm alone;

FIG. 4 is a cross-sectional diagram showing the positioning of the blower; and

FIG. 5 is a front view of the blower alone.

DETAILED DESCRIPTION OF THE INVENTION

Figure 1:
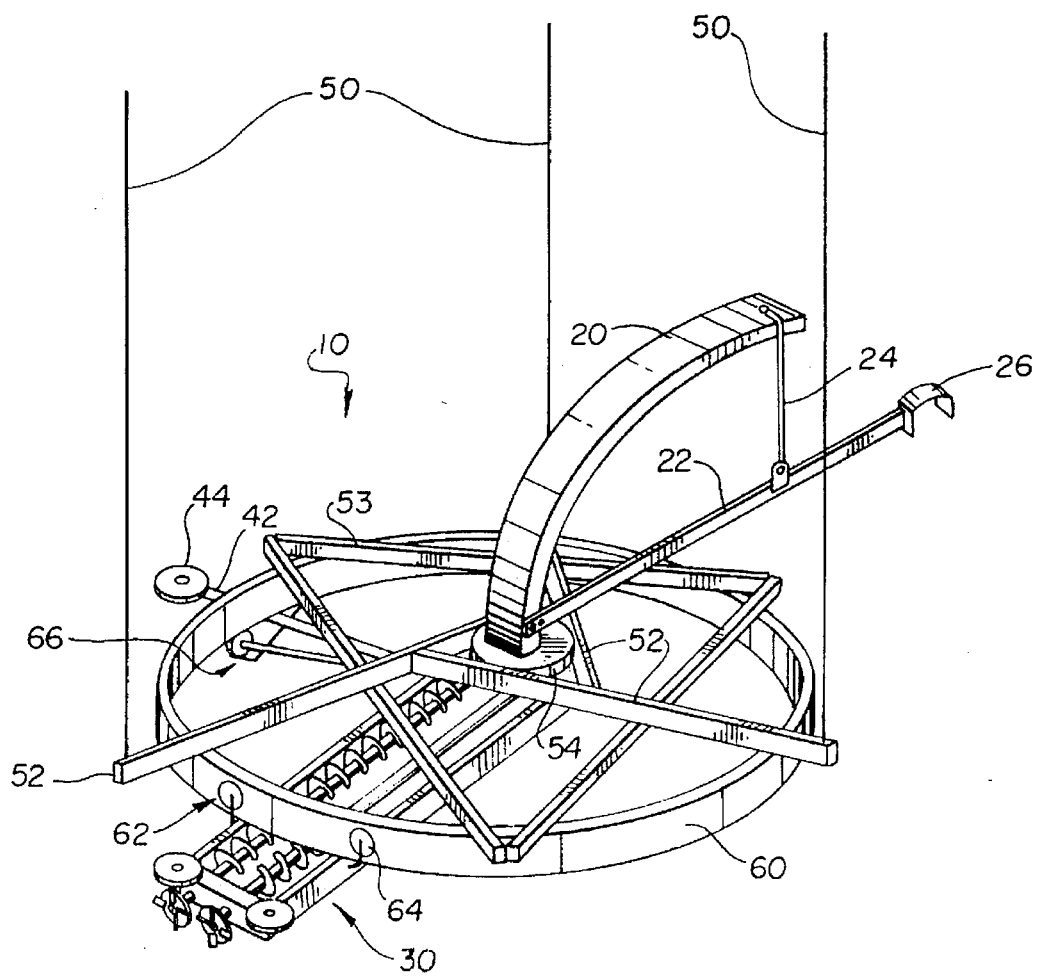
FIG. 1 is a perspective view of the silo unloader of the present invention.
Figure 2:
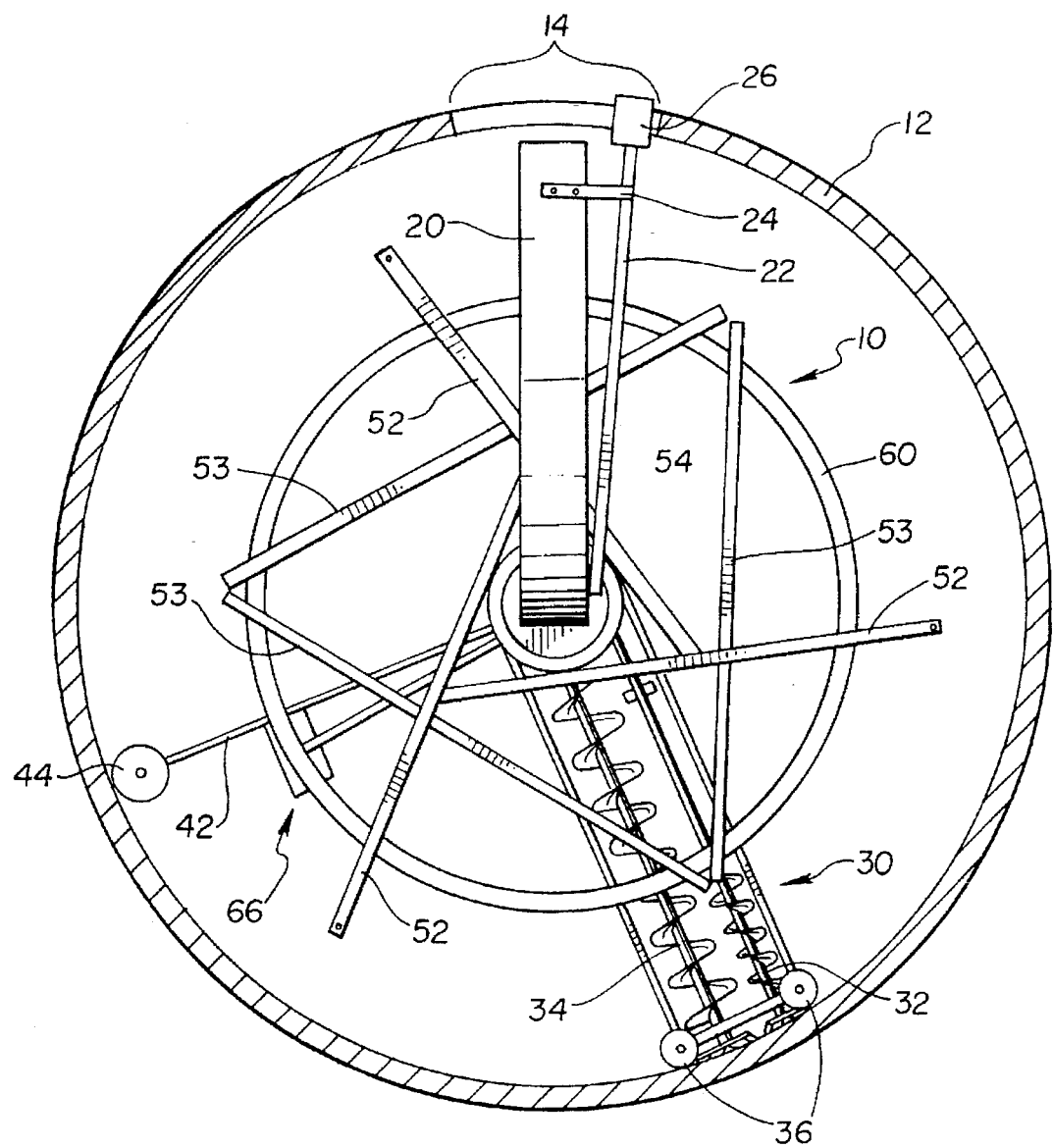
FIG. 2 is a top view of the silo unloader of the present invention.

Referring now to FIGS. 1 and 2 which show a perspective view and a top view of the silo unloader of the present invention. For convenience, like numbers have been used to identify like parts.

As is understood by those skilled in the art, the silo unloader is generally placed in the interior of a cylindrical tower silo. The silo walls 12 are cylindrical in shape with a drop chute opening 14 positioned at some point along the wall. Associated with the drop chute opening 14 is a drop chute which extends the entire height of the silo along one side thereof. In operation, the silo unloader removes silage from the interior of the tower silo and projects it through drop chute opening 14 into the drop chute. The silage is then dropped to ground level where it can be handled further.

Attached at the center portion of the silo unloader and extending toward drop chute opening 14 is a discharge spout 20 which is used to direct silage toward drop chute opening As is necessary with all silo unloaders, the present invention utilizes an auger arm 30 to retrieve silage and pull it toward a center point within the silo. Auger arm 30 of the present invention utilizes a unique design which efficiently cuts through compacted or frozen silage and efficiently moves silage toward a blower 40. Blower 40 is then used to propel the silage along the discharge spout 20 and out of the silo.

Auger arm 30 has a first auger 32 and a second auger 34 which are situated substantially parallel to one another. Auger arm 30 also has a pair of guide wheels 36 which contact silo walls 12 as the auger arm is rotated around the silo. A second guide arm 42 is attached to auger arm 30 and extends substantially perpendicular therefrom to also contact silo walls 12. These guide wheels are utilized to align the silo unloader within the silo walls. Also attached to the end of guide arm 42 is another guide wheel 44 which contacts silo walls 12.

The entire silo unloader 10 is suspended from the top of the silo by a framework and pulley mechanism (not shown in the Figures) by a number of extension cables 50. In the preferred embodiment the unloader is suspended by three suspension cables 50 which are attached to three suspension arms 52. Suspension arms 52 are configured such that a central triangle is created by these three members. Three cross arms $3 are utilized to further stabilize the unloader. Within this central triangle is a mounting and collector ring 54 which serves many functions. Mounting and collector ring 54 forms a contact point for attachment of discharge spout 20. This attachment allows for the projection spout to be rotated up and down so as to align it with the appropriate trap chute opening 14. Also, mounting and collector ring 54 serves as the central bearing around which the rotatable portion of the unloader rotates. Lastly, mounting and collector ring 54 provides a mechanism to transfer power (electricity) to the necessary power supplies (a blower power supply, and an auger/drive power supply).

In order to better accomplish the alignment of discharge spout 20 with drop chute opening 14, a guide arm 22 is provided. Guide arm 22 also has a spout connection 24 attached to discharge spout 20. Also, at the end of guide arm 22 is a coupling mechanism 26 which is configured to interact with trap chute opening 14. As is well known, trap chute opening 14 typically is configured as a set of openable doors extending the length of the tower silo. When an appropriate door is opened, coupling mechanism 26 interacts with the bottom ledge of the newly opened drop chute opening 14 and conveniently aligns the discharge spout 20 therewith. Spout connection 24 assists in this appropriate alignment.

Also connected to mounting and collector ring 54 is a blower spout (not shown). The blower spout is aligned with the center of mounting and collector ring 54 such that any material blown out of blower spout is directed into the inlet of discharge spout 20. This connection also assists in the suspension of auger arm 30.

Also attached to suspension arms 52 is a rotational guide ring 60. Rotational guide ring 60 is concentric with mounting and collector ring 54 and is intended to be positioned substantially concentric with silo walls 12. Rotational guide ring 60 performs a number of functions. First, it acts as a support member for suspending auger arm 30. Auger arm 30 has an attachment mechanism 62 attached thereto. Attachment mechanism 62 generally consists of some type of suspension wheel or guide wheel 64. Guide arm 42 may be similarly suspended from rotational guide ring 60 by a similar attachment mechanism 62. The purpose of attachment mechanism 62 is to allow auger arm 30 to rotate about the center of the silo. The second function of rotational guide ring 60 is to provide a mechanism to drive or propel auger arm 30 around the silo. This is generally accomplished by providing a drive mechanism 66 which engages with rotational guide ring 60 to propel auger arm 30 around the silo. This drive mechanism can take on many forms; however, in the preferred embodiment it includes a geared drive wheel which engages with holes located in the bottom of rotational guide ring 60.

Referring to FIG. 3, there is shown a more detailed drawing illustrating the auger arm alone. As previously mentioned, auger arm 30 includes first auger 32 and second auger 34. First auger 32 is situated on a forward side 70 of auger arm 30. Similarly, second auger 34 is located on the rear side 72 of auger arm 30. In this context, forward and rear are relative to the direction of motion the auger will undergo in operation. Stated another way, the auger arm of FIG. 3 will rotate in a counterclockwise direction pivoting about a point of rotation 77 (on the left hand side of FIG. 3).

First auger 32 as shown in FIG. 3 is slightly smaller in size (diameter) than second auger 34. Furthermore, first auger 32 only has fliteing which extends a portion of the entire length. More specifically, these auger fliteing starts at an outer end 74 of auger arm 30 and extend a portion of the way toward an inner end 76. First auger 32 rotates around a first auger shaft 33.

Second auger 34 alternatively is somewhat larger in size than first auger 32 and extends the entire length of auger arm 30.

In operation, first auger 32 rotates in a forward direction as shown by reference 78. This direction of rotation causes the first auger to dig into the silage and tends to pull the auger arm in the desired direction of rotation. Additionally, second auger 34 rotates in an opposite direction from that of first auger 32. This counter-rotation causes a force to be generated in a direction opposite from that of auger 32. The counter-rotations (of the two augers) tends to equalize and minimize the actual pulling that is done by the augers themselves. This allows rotation of the auger to be more easily controlled by drive mechanism 66 (not shown in FIG. 3).

As previously mentioned, first auger 32 is smaller in size than second auger 34. These augers, however, are positioned such that their drive axes are in the same horizontal plane. This results in the bottom or lower most level of first auger 32 being slightly higher (horizontally) than the bottom most edge of second auger 34. This alignment is intentional as it causes the first auger 32 to initially cut or dig to a first level. Subsequently, second auger 34 is allowed to follow behind first auger 32 and dig to a slightly deeper level. In this dual action, the first auger will shave off an upper level of silage and the second auger will shave off a slightly lower level of silage. Consequently, neither auger is trying to dig to great depths on its own and the two augers function very efficiently in conjunction with one another.

The counter-rotating augers also tend to complement one another by each propelling material toward a middle portion 80 of the two augers. The two augers then work together to pull material toward the center of the silo.

Lastly, the first and second augers are geared to rotate at different speeds. This has numerous advantages. First, front auger 32, moving at a faster rate of rotation, can aggressively cut and rip silage to an appropriate depth. By rotating at a faster rate than the rear auger 34, the possibility of any slugging between the two augers 32 and 34 is eliminated. All the clods are broken up and pulled apart. Then second auger 34—which moves at a slower rate of speed—can effectively cut silage to its appropriate depth and deliver the silage to the blower. This detuning of frequencies between the two augers will create a cutting action between the two auger blades that is much smoother operating. Furthermore, first auger and second auger 32 are positioned fairly close to one another. This allows a cutting or chopping of chunks to a fairly fine level.

First auger 32 has fliteing extending only a portion of the distance from outer end 74 toward the center. This dimension has several advantages. First, it is realized that in very cold weather, the hardest silage to break up is always located at the outer edges of a tower silo. This is due to the fact that silage will freeze from the outside toward the center in a typical tower silo. Therefore, the most aggressive cutting action is always required at the outer edges.

Utilizing first auger 32 with fliteing at only an outer portion thereof allows for more effective positioning of blower 40. (The positioning of blower 40 and its advantages will be discussed at a later point in relation to FIG. 4).

Second auger 34, however, extends the entire length of auger arm 30. However, it is noted that a central portion 82 has a reversed direction of action. Second auger 34 rotates in a direction so as to cause material to be pulled toward the center or collection point 84. As will be more fully discussed at a later point in the present application, this collection point coincides with the point at which blower 40 receives the silage and propels it out of the silo. Once second auger 34 has moved material to collection point 84, it encounters a pair of flipping blades 86. Due to the rotation of second auger 34, these blades encounter material and cause it to be flipped up into a blower opening (not shown in FIG. 3). Additionally, the auger fliteing at central portion 82 causes any material which has been overdrawn to be moved back toward collection point 84. Also, first auger shaft 33 has a pair of blades 88 which cause any material sitting thereabout to be pushed back toward second auger 34. Thus, the use of the dual augers as configured in auger arm 30 efficiently cut and move silage from the silo toward collection point 84.

Also attached to auger arm 30 is a power supply 90 designated for driving the two augers. Rotational power is transferred from power supply 90 to a first transmission 92 and a second transmission 94 which drive first auger 32 and second auger 34, respectively. It will be understood by those skilled in the art that these power supplies and transmissions could take on any form such as electrical or gas powered motors with pulleys or gear box systems. The only necessity is that the first auger and second auger be driven at different speeds to create an appropriate function for each of these augers.

Lastly, auger arm 30 has a pair of frost cutters 96 and 98 located at the outer end of auger arm 74. First frost cutter 96 is attached to the shaft which drives first auger 32, while second frost cutter 98 is attached to the shaft which drives second auger 34. In operation, these frost cutters will be positioned against the walls of the silo and will cut any frozen material attached to those walls. As can be imagined, it is critical that all material be removed from the walls of the silo so that the effective space of the silo is properly utilized.

While not specifically shown in FIG. 3, blower 40 will be positioned approximately in the area marked by the dotted lines 100.

Referring now to FIG. 4, there is a cross-sectional diagram of the auger arm and blower assembly of the present invention. Blower 40 is situated at an angled position above both second auger 34 and first auger shaft 33. The blower is positioned at an angle so that it can cooperate with the auger to effectively and efficiently blow silage out of the silo. Blower 40 has a blower drive shaft 110 which is attached to its own designated power supply (not shown) through the use of a belt and pulley mechanism 112. Rotation of blower drive shaft 110 causes blower blades or paddles 114 to rotate. Referring now to FIG. 5, there is shown a front view of blower 40 as seen from its opening side 116. Blower 40 is a typical closed bottom blower. Closed bottom means that the blower blades 114 are entirely enclosed about the circumference of the blower. Also, a close tolerance can be maintained between the blades 114 and the blower housing 122. By utilizing an enclosed blower, power efficiency and effectiveness is increased.

Referring again to FIG. 4, in operation, as outlined with reference to FIG. 3, silage is propelled toward a collection point 84. When silage reaches collection point 84, it interacts with flipping blades 86 to cause the silage to be flipped up into a blower inlet 118. When silage is propelled into blower inlet 118 it then encounters blower blades 114 (rotating in a clockwise direction in FIG. 5) and is propelled out of a blower outlet 120. As commonly understood, blower outlet 120 is aligned to cooperate with discharge spout 20 (shown in FIGS. 1 and 2). Thus silage is moved from blower outlet 120 through discharge spout 20 and out of the silo through drop chute opening 14.

The tipping or angling of the blower gives the silo unloader of the present invention many advantages. The angled position of blower 40 allows first auger 32 and second auger 34 to be positioned closer to one another. As previously mentioned, prior art dual auger silo unloaders have blowers utilizing open bottom blowers situated between the two augers. This has required the two augers to be a substantial distance from one another (creating a very wide auger arm). Although any angle could be used, in the preferred embodiment a tilt angle ($\theta$) of 25° has been effectively used.

Additionally, by utilizing an auger arm which is narrower than most dual auger silo unloaders, allows the frost cutters to be positioned perpendicularly against the edge of the silo walls at all times. This creates a much more efficient operation of the frost cutters as they will efficiently clean the silo walls. The angling of the blower 40 also allows for the use of a closed bottom blower in a two auger machine. Furthermore, the actual blower utilized can be wider (and shorter) than those previously used with double auger blowers, therefore requiring much less power to operate.

Also by placing blower 40 over the second auger 34, allows for this auger to be positioned directly in the middle of the silo. This second auger 34 will work to cut away any hard pack or plug that would develop in the center of the silo.

By tipping blower 40 at an angle also causes all silage material to fall out of the interior cavity of blower 40 when stopped. Therefore no material will be allowed to freeze in the bottom of the blower itself. If material does freeze in this position, it makes restarting the blower extremely difficult and damaging to the product.

Having illustrated and described the principles of the present invention in the preferred embodiment to be apparent to those skilled in the art that the invention can be modified in arrangement and detail without departing from such principles. We claim all modifications coming within the scope and spirit of the following claims.

It is claimed:

1. A silo unloader for removing silage from a tower silo by propelling silage out of a drop chute opening, the unloader comprising:

a frame suspended within the silo from an upper portion thereof;

an auger arm rotatably attached to the frame having a first auger and a second auger for moving the silage to a collection point, the first auger and the second auger positioned substantially parallel to one another wherein the first auger operates over only a portion of the auger arm and has a first auger shaft extending over the remaining length of the auger arm, while the second auger operates over the entire length of the auger arm, the second auger further has a mechanism for directing silage from the collection point to an exit point directly adjacent the second auger;

a closed bottom blower attached to the frame and positioned above the first auger, the blower having an inlet for receiving silage and an outlet, the inlet positioned above the second auger at an angle such that the inlet is at the exit point; and a projection spout attached to the frame and aligned with the blower outlet to receive silage from the blower and direct it to the drop chute opening.

2. The unloader of claim 1 wherein the blower has a central drive shaft and a plurality of blower blades, the blower positioned such that a tilt angle exists between the central drive shaft and a horizontal reference plane.

3. The unloader of claim 2 wherein the tilt angle is twenty-five degrees.

4. The unloader of claim 1 further comprising:

a first frost cutter attached to the first auger such that the first frost cutter extends from an outer end of the auger arm; and a second frost cutter attached to the second auger such that the second frost cutter also extends from the outer end.

5. A silo unloader for removing silage from a tower silo by propelling silage out of a drop chute opening, the unloader comprising:

suspension means attached to an upper portion of the silo;

a frame suspended from the suspension means;

an auger arm rotatably attached to the frame such that a first end of the auger arm is substantially centrally positioned within the silo and a second end of the auger arm is located adjacent the silo wall, the auger arm having a first auger and a second auger for interacting with the silage to move the silage to a collection point, the first auger and the second auger positioned substantially parallel to one another and substantially horizontally aligned with one another, wherein the first auger operates over only a portion of the auger arm and has a first auger shaft extending over the remaining length of the auger arm and the second auger operates over the entire length of the auger arm, the second auger further has a mechanism for propelling silage from the collection point to an exit point directly adjacent the second auger;

a drive mechanism attached to both the frame and the auger arm for causing the auger arm to be rotated around the silo;

a closed bottom blower attached to the auger arm and positioned above the first auger, the blower having an inlet for receiving silage and an outlet, the inlet positioned above the second auger at an angle such that the inlet is at the exit point, the closed bottom blower having a blower axis which is positioned at a tilt angle with respect to a horizontal reference plane; and a projection spout attached to the frame and aligned with the blower outlet to receive silage from the blower and direct it to the drop chute opening.

6. The silo unloader of claim 5 wherein the first auger has a first exterior diameter and the second auger has a second exterior diameter, the second exterior diameter being larger than the first diameter.

7. The silo unloader of claim 5 wherein the horizontal reference plane is parallel to a plane containing the first auger shaft and the second auger shaft.

8. The unloader of claim 5 further comprising:

a first frost cutter attached to the first auger such that the first frost cutter extends from an outer end of the auger arm; and a second frost cutter attached to the second auger such that the second frost cutter also extends from the outer end of the auger arm.

9. The unloader of claim 5 wherein the tilt angle is within the range of twenty to thirty degrees.

10. The silo unloader of claim 5 wherein the first auger and the second auger rotate in directions opposite one another so as to move silage into an area between the first auger and the second auger.

11. The silo unloader of claim 5 wherein the frame is suspended from the suspension means by a plurality of cables.

12. The silo unloader of claim 5 further comprising a power supply to drive the first auger and the second auger.

13. The silo unloader of claim 12 wherein the power supply comprises an electric motor.

14. The silo unloader of claim 12 further comprising a transmission to transfer rotational power from the power supply to the first auger and the second auger.

15. The silo unloader of claim 5 wherein the drive mechanism includes a drive motor and a drive gear for propelling the auger arm around the silo, the drive gear configured to interact with the frame to cause relative rotation between the auger arm and the frame.

16. The silo unloader of claim 15 wherein the frame includes a rotational guide ring situated substantially horizontally within the silo which interacts with the drive gear.

17. A silo unloader for transferring silage out of a substantially cylindrical tower silo by removing silage from the top of the silage piled within the silo and propelling the silage through a drop chute opening located on a side of the tower silo, the unloader comprising:

suspension means attached to an upper portion of the silo;

a frame suspended from the suspension means by a plurality of cables such that the frame can be variably positioned within the silo, the frame including a rotational guide ring which is situated substantially concentric with an outer wall of the tower silo;

an auger arm rotatably attached to the frame and the rotational guide ring such that a first end of the auger arm is substantially centrally positioned within the silo and the second end of the auger arm is located adjacent the silo wall, the auger arm having a first auger and a second auger for interacting with the silage to move the silage to a collection point, the first auger and the second auger positioned substantially parallel to one another and substantially horizontally aligned with one another, wherein the first auger operates over only a portion of the auger arm and has a first auger shaft extending over the remaining length of the auger arm, while the second auger operates over the entire length of the auger arm, the second auger further having a mechanism for propelling silage from the collection point to an exit point directly adjacent the second auger;

a power supply attached to the auger arm for driving the first auger and the second auger;

a transmission attached to the power supply and to the first auger and the second auger, to transfer rotational power from the power supply to the first auger and the second auger;

a drive mechanism attached to both the frame and the auger arm for causing the auger arm to be rotated around the silo, the drive mechanism including a drive motor and a drive gear for propelling the auger arm around the silo, the drive gear configured to interact with the rotational guide ring to cause auger arm to rotate about the central portion of the silo;

a first frost cutter attached to the first auger such that the first frost cutter extends from an outer end of the auger arm and is positioned adjacent the silo wall, the first frost cutter for removing silage attached to the silo wall;

a second frost cutter attached to the second auger such that the second frost cutter also extends from the outer end of the auger arm and is positioned adjacent the silo wall, a closed bottom blower attached to the auger arm and positioned above the first auger, the blower having an inlet for receiving silage and an outlet, the inlet positioned above the second auger at an angle such that the inlet is at the exit point, the closed bottom blower having a blower axis which is positioned at a tilt angle with respect to a horizontal reference plane; and a projection spout attached to the frame and aligned with the blower outlet to receive silage from the blower and direct it to the drop chute opening.

18. The unloader of claim 17 wherein the tilt angle is within the range of twenty to thirty degrees.

* * * * *

UNITED STATES PATENT AND TRADEMARK OFFICE
CERTIFICATE OF CORRECTION

PATENT NO. : 5,642,977
DATED : July 1, 1997
INVENTOR(S) : Gregg W. Hanson; Howard D. Jacobson It is certified that error appears in the above-indentified patent and that said Letters Patent is hereby corrected as shown below:

Column 3, line 16, delete "log" and insert therefor --lot--.

Column 3, line 48, delete "results" and insert therefor --result--.

Column 4, line 22, delete "narrow" and insert therefor --narrower--.

Column 5, line 25, after "opening" at the end of the sentence insert --14.--

Column 5, line 52, delete "$3" and insert therefor --53--.

Column 6, line 49, delete "these" and insert therefor --the--.

Column 6, line 50, delete "extend" and insert therefor --extends--.

Column 9, line 19, delete "to" and insert therefor --it should--.

Column 12, line 6, between "cause" and "auger" insert --the--.

UNITED STATES PATENT AND TRADEMARK OFFICE
CERTIFICATE OF CORRECTION

PATENT NO. : 5,642,977
DATED : July 1, 1997
INVENTOR(S) : Gregg W. Hanson; Howard D. Jacobson It is certified that error appears in the above-identified patent and that said Letters Patent is hereby corrected as shown below:

Column 12, line 18, delete "," and insert therefor --";".

Signed and Sealed this

Thirtieth Day of December, 1997

Attest:

BRUCE LEHMAN

*Attesting Officer*  *Commissioner of Patents and Trademarks*